United States Patent [19]

Inaba et al.

[11] 4,218,705
[45] Aug. 19, 1980

[54] DELAY COMPENSATOR FOR A TELEVISION SIGNAL

[75] Inventors: Masao Inaba; Atsumi Sugimoto, both of Tokyo, Japan

[73] Assignee: Nippon Electric Company, Ltd., Tokyo, Japan

[21] Appl. No.: 938,913

[22] Filed: Sep. 1, 1978

[30] Foreign Application Priority Data

Sep. 5, 1977 [JP] Japan ............................ 52-107012

[51] Int. Cl.² .............................................. H04N 5/04
[52] U.S. Cl. .................................................. 358/149
[58] Field of Search ............. 358/149, 127; 179/2 TV

[56] References Cited

U.S. PATENT DOCUMENTS 4,134,131  1/1979  Hopkins ............................... 358/149

Primary Examiner—Richard Murray
Attorney, Agent, or Firm—Hopgood, Calimafde, Kalil, Blaustein & Lieberman

[57] ABSTRACT

Delay compensation apparatus for minimizing the delay differences between a video signal transmitted through a plurality of frame synchronizers, which delay the video signal, and a normally undelayed audio signal, the audio and video signal making up a complete television signal. Combinations of discreet delay intervals are imposed on the audio signal such that delay differences between the audio and video signal are minimized to the extent that the negligible remaining delay difference does not degrade the reproduced television picture.

3 Claims, 3 Drawing Figures

DELAY COMPENSATOR FOR A TELEVISION SIGNAL

FIELD OF THE INVENTION

This invention relates to a delay compensator for a television video signal transmitted through a path separated from the audio signal path and, more particularly, to a system for compensating for the delay of a television video signal unavoidably caused when the video signal is processed by the use of one-frame or one-field memories included in the transmission path.

BACKGROUND OF THE INVENTION

As disclosed in U.S. Pat. Nos. 3,909,839 and 4,007,486, a frame synchronizer has a one-frame or one-field memory adapted to temporarily store an incoming video signal on a frame-by-frame or field-by-field basis, which is then read out in synchronism with a local reference synchronizing signal. The use of a frame synchronizer makes possible the so-called multi-station relay telecast, in which a plurality of incoming video signals, supplied from remote television stations mutually out of synchronism, can be selectively combined into one video signal synchronised with the local reference synchronizing signal. In addition the frame synchronizer has brought about a revolutionary change in television signal processing for special effects, due to its adaptability to digital signal control.

While complete synchronization of the incoming video signal with the local reference synchronizing signal is ensured by the frame synchronizer, the video signal itself can be delayed by a one-frame or one-field period. On the other hand, the audio signal component of the television signal does not suffer such delay because it is normally excluded from the signal processing for the video signal and allowed to separately pass to the output of the video signal processing stages. As a result, the video signal delay becomes conspicuous in the reproduced picture due to the delay between the picture displayed and the sound, and, between the motion of the announcer's lips and his articulation. Our experiments shown that the tolerable limit to the delay is approximately one frame period of a cinefilm, i.e., 1/24 of a second (41.7 milliseconds). Such a limit is easily exceeded when two frame synchronizers are connected in tandem for a multi-station relay telecast or for special video effects. This difficulty is also experienced in a standard conversion system which employs a one-frame memory.

It is therefore an object of the present invention to provide a delay compensator for video signal components for use with frame synchronizers or standard conversion systems including one-frame or one-field memory.

SUMMARY OF THE INVENTION

It is a feature of the invention that delay means are inserted in the audio transmission path to provide audio signal delay substantially equal to the delay suffered by the video signal.

It is another feature of the invention that the audio delay means provides delay intervals equal to an integral multiple m of the interval of one half of one field period.

It is a further feature of the invention that apparatus is included to select the integer m so that audio signal delay and video signal delay are substantially equalized, the selection apparatus being inexpensive and readily manufactured.

The object and features of the invention will be better understood from the following description taken in conjunction with accompanying drawings.

DETAILED DESCRIPTION

Figure 1:
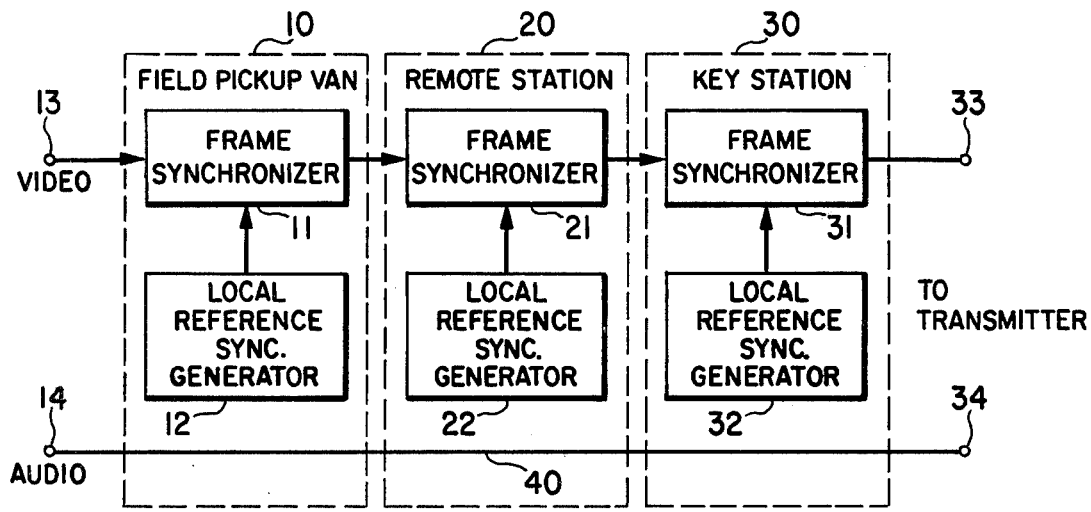
FIG. 1 is a block diagram of a serial combination of three frame synchronizers to which the present invention is applicable.

Referring to FIG. 1, three video signal processing stages 10, 20 and 30, which may be separate television stations, mobile field pickup systems abroad a van, or video signal processors for special effects, include frame synchronizers 11, 21 and 31, respectively, connected in tandem. Frame synchronizers 11, 21 and 31 have respective synchronizing signal generators 12, 22 and 32. An audio transmission path 40 is provided which is separate from the tandem connection of the frame synchronizers. It is assumed, in the illustrated arrangement, that the processing stage 10 comprises a field pickup van; stage 20 consists of a remote local television station; and stage 30 consists of a key television station linked with the remote station through a long-haul signal relay system.

A video signal supplied from input terminal 13 suffers a delay due to the memory in frame synchronizer 11, the frame synchronizer is serving to synchronize the video signal with a first local reference synchronizing signal, supplied from a first local reference synchronizing signal generator 12. The output video signal from processing stage 10 is transmitted to the second processing stage 20, and suffers another delay while being synchronized with a second local reference synchronizing signal supplied from the second generator 22. The output video signal from the processing stage 20 suffers still another delay while being synchronized with a third reference synchronizing signal supplied from the third generator 32. The output of stage 30, obtained at the output terminal 33, is supplied to a transmitter (not shown) for broadcasting.

The audio signal supplied to input terminal 14, at stage 10, is transmitted to an output terminal 34 at stage 30 through the audio transmission path 40. The audio signal therefore is passed through stages 10, 20 and 30 without suffering the delay caused by the frame synchronizers 11, 21 and 31. The long-haul relay link between stages 20 and 30 may cause some delay in the audio signal. However, this delay is much smaller than the overall delay of the video signal and is essentially negligible. Moreover, since the small amount of delay suffered by the audio signal, due to the lone-haul relay transmission, is also imposed on the video signal, there is no need for compensation of this negligible delay.

The amount of delay which a video signal suffers from processing in a frame synchronizer depends on the difference in phase of the incoming video signal from the reference synchronizing signal. Therefore, the delay can range from zero to a maximum value depending on whether the incoming signal is in phase or completely out of phase with the reference synchronizing signal. The probability is equal for all possible values of delay.

The maximum delay for a frame-memory type frame synchronizer is 33.3 milliseconds, while that for a field-memory type frame synchronizer is 16.7 milliseconds. Therefore, a tandem connection of two frame-memory type frame synchronizers or three field-memory type synchronizer can cause a delay greater than the above-mentioned tolerable limit of 41.7 milliseconds.

To compensate for such video signal delay, the audio signal may given an equal amount of delay. However, controlling the delay in the audio signal, for all the possible delay values suffered by the video signal, requires a complicated system which is very costly to manufacture. Therefore, the present invention relies on a discrete delay control means for compensation, based on a statistical analysis of the overall delay resulting from video signal processing by more than one frame-memory type or more than two field-memory type frame synchronizers.

While the probability is equal for all possible delay values when only one frame synchronizer is involved, the corresponding probability for the over-all delay value, in the case of two tandem-connected frame synchronizers peaks at a delay time equal to one frame (for frame-memory type) or one field period (for field memory type) and decreases to nearly zero as the delay approaches zero or approaches the maximum delay equal to two-frame or two-field periods. Similarly, when three frame synchronizers are involved, this peak appears at a delay time equal to 1.5 times the one frame or one field period, with the probability for the close-to-zero and close-to-maximum (three-frame or three-field period) values approaching zero. The same applies to the situations where more than three frame synchronizers are involved; i.e., when the number is four, five, or six, the peak is observed respectively at a delay value of 2, 2.5, or 3 times as large as the one-frame or one-field period. For further details of statistical analysis, reference is made to "PROBABILITY, RANDOM VARIABLES AND STOCHASTIC PROCESSES" by Poulis, McGrow-Hill Book Company, pages 266–268.

Based on the above-outlined statistical nature of the distribution of the amounts of the overall delay, the present invention advantageously employs a plurality of delay means for the audio signal, the delay means having fixed amounts of delay. One group of delay means has a delay equal to one half of one field period, while the other group has a delay equal to one frame or one field period.

Figure 2:
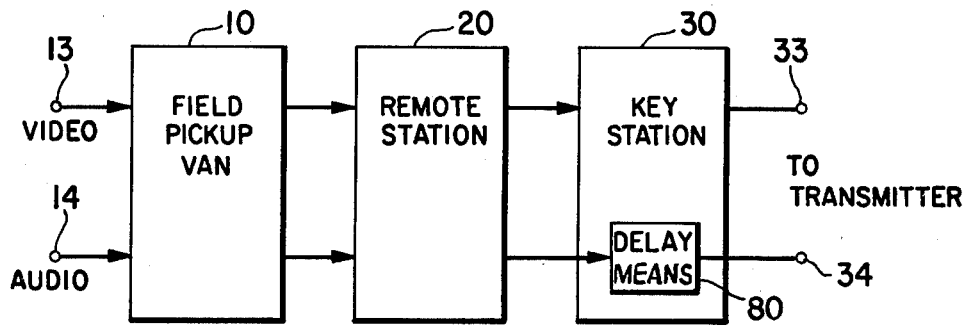
FIG. 2 is a block diagram of one embodiment of the invention.

Referring to FIG. 2, stages 10, 20 and 30 are identical to those shown in the arrangement of FIG. 1 except that key station 30 has a discrete delay means 80 for the audio signal. Delay means 80 has a discretely controllable amount of delay $D_T$ equal to an integral multiple of one half of one field period, i.e., $$D_T = 16.7 \times m \text{ (milliseconds)}$$

The value of the integer m is determined so that $D_T$ is made equal to a period which is one half of the maximum of the possible total delay caused by frame synchronizers 11, 21, and 31. Thus, assuming that the number of frame synchronizers having one-frame-memory and one-field-memory are represented by $m_1$ and $m_2$, respectively, the following equations are satisfied:

$$m = m_1 + m_2$$

$$D_T = 16.7(m_1 + 2m_2) \text{ (milliseconds)}$$

when these conditions are established, even where the one-frame-memory type and one-field-memory type frame synchronizers coexist, the delay time $D_T$ of the audio delay means 80 is made equal to the delay time which has the highest probability.

Figure 3:
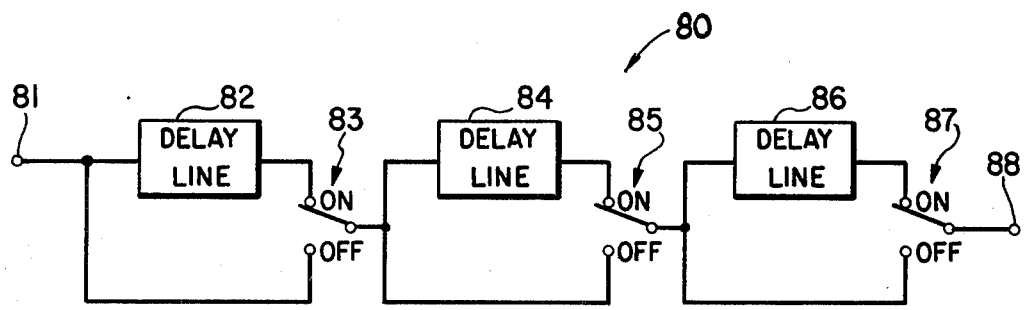
FIG. 3 shows, in block diagram form, the details of a portion of the embodiment shown in FIG. 2.

Referring to FIG. 3, the discretely controllable audio delay means 80 comprises an input terminal 81 for receiving the audio signal transmitted to key station 30, a first delay line 82 having a delay time equal to one half of a field period (about 8.33 milliseconds), a first switch 83, a second delay line 84 having a delay time equal to a field period (about 16.7 milliseconds), a second switch 85, a third delay line 86 having a delay time equal to twice the field period (about 33.3 milliseconds), a third switch 87 and a terminal 88 connected to the audio output terminal 34 of the key station 30. Thus, the total delay time $D_T$ selectable by the first to third switches 83, 85 and 87 is an integral multiple of a half-field period, the integer being 0, 1, 2, . . . and 7. The relationship between the switches 83, 85 and 87 and the delay time $D_T$ is indicated below, where "ON" indicates that the output contact of the switch referred to is connected to the output side of the delay line and "OFF" indicates that it is connected to the input side of same.

| Switch 83 | OFF | ON | OFF | ON | OFF | ON | OFF | ON |
|---|---|---|---|---|---|---|---|---|
| Switch 85 | OFF | OFF | ON | ON | OFF | OFF | ON | ON |
| Switch 87 | OFF | OFF | OFF | OFF | ON | ON | ON | ON |
| Total length of delay time, in multiples of ½ of a field period | 0 | 1 | 2 | 3 | 4 | 5 | 6 | 7 |

The audio delay circuit 80, which provides eight different lengths of delay time by varying the combination of switch positions, can set the delay time to correspond to the variation in the delay path of the video signal to key station 30, i.e., in the number of the frame type or field-type frame synchronizers connected in tandem.

The embodiment discussed above has proved to be effective in eliminating practically all video-audio delay differences in multi-frame synchronizer-stage video signal processing. However a fraction of one percent of such differences is uncompensated in a more-than-three frame synchronizer combination due to the reliance of the present invention on the above-mentioned statistical nature of the overall delay.

Whereas delay lines having single, double and quadruple lengths of delay time are used in the above described embodiment, it should be noted that there are many other conceivable methods. For instance the invention could include:

(1) Delay lines having equal lengths of delay time,
(2) Delay line taps on a single delay line, or
(3) Controlling the delay time with a single delay line which would include a memory, etc.

Although a specific embodiment of this invention has been shown and described, it will be understood that various modifications may be made without departing from the spirit of this invention.

What is claimed is:

1. A delay compensator for a video signal component of a television signal transmitted through a video transmission path, the video signal being separate in part from an audio transmission path for an audio signal component of said television signal, said video transmission path comprising a plurality of frame synchronizers connected in series, each of said frame synchronizers comprising memory means having the capacity for temporarily delaying one field period of said video signal, said video signal being written in and read out of said memory means of each of said frame synchronizers, said system comprising;

delay means provided on said audio transmission path for delaying said audio signal by a period equal to a multiple m of one half of one field period, m being an integer, and means for selecting said integer m in order to substantially equalize the audio signal delay caused by said delay means to one half of the maximum of predetermined total video signal delay caused by said plurality of frame synchronizers.

2. A delay compensator in accordance with claim 1 wherein said delay means includes a plurality of series-connected delay lines, each of said delay lines having a delay period equal to one half of one field period multiplied by the integer m.

3. A delay compensator in accordance with claim 2 wherein said selecting means includes means for selectively connecting and disconnecting individual one of said series-connected delay lines.

* * * * *